US012611809B2

(12) United States Patent
Freedman et al.

(10) Patent No.: US 12,611,809 B2
(45) Date of Patent: Apr. 28, 2026

(54) METHODS FOR DISPENSING AND FORMING 3A MOLECULAR SIEVE HOT MELT ENTRAINED POLYMERS ONTO SUBSTRATES

(71) Applicant: CSP Technologies, Inc., Auburn, AL (US)

(72) Inventors: Jonathan R. Freedman, Auburn, AL (US); Kasey Myers, Auburn, AL (US); William Frederick Spano, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 481 days.

(21) Appl. No.: 18/160,397

(22) Filed: Jan. 27, 2023

(65) Prior Publication Data

US 2023/0166440 A1     Jun. 1, 2023

Related U.S. Application Data

(63) Continuation of application No. PCT/US2021/071090, filed on Aug. 3, 2021.
(Continued)

(51) Int. Cl.
*B29C 48/154*          (2019.01)
*B29C 48/00*           (2019.01)
(Continued)

(52) U.S. Cl.
CPC ............ *B29C 48/022* (2019.02); *B29C 48/08* (2019.02); *B29C 48/154* (2019.02); *B29C 48/21* (2019.02);
(Continued)

(58) Field of Classification Search
CPC .......... B32B 2439/00; B32B 2307/732; B32B 15/08; B32B 1/00; B29L 2031/712;
(Continued)

(56) References Cited

U.S. PATENT DOCUMENTS 3,826,602 A     7/1974  Shaffer et al.
5,605,720 A     2/1997  Allen et al.
(Continued)

FOREIGN PATENT DOCUMENTS

CA          2902941 A1     9/2014
CN          1832812 A      9/2006
(Continued)

OTHER PUBLICATIONS

International Search Report issued in PCT/US2021/071090, mailed Nov. 22, 2021.
(Continued)

*Primary Examiner* — Vishal I Patel
(74) *Attorney, Agent, or Firm* — David B. Gornish; Eckert Seamans Cherin & Mellott, LLC

(57)          ABSTRACT

Disclosed are methods for forming and adhering an entrained polymer structure to a substrate. The methods include providing a substrate configured to receive application of a molten entrained polymer. A 3 A molecular sieve entrained polymer in molten form is applied in a predetermined shape, to a surface of the substrate, to form a solidified entrained polymer structure on the substrate. The entrained polymer includes a monolithic material formed of at least a base polymer and 3 A molecular sieve. The surface of the substrate is compatible with the molten entrained polymer so as to thermally bond with it. In this way, the entrained polymer bonds to the substrate and solidifies upon sufficient cooling of the entrained polymer.

16 Claims, 5 Drawing Sheets

Related U.S. Application Data

(60) Provisional application No. 63/060,319, filed on Aug. 3, 2020.

(51) Int. Cl.

| | |
|---|---|
| *B29C 48/08* | (2019.01) |
| *B29C 48/21* | (2019.01) |
| *B29C 48/255* | (2019.01) |
| *B29C 48/345* | (2019.01) |
| *B32B 1/00* | (2006.01) |
| *B32B 15/08* | (2006.01) |
| *B29K 103/08* | (2006.01) |
| *B29K 105/00* | (2006.01) |
| *B29L 31/00* | (2006.01) |

(52) U.S. Cl.

CPC ........ *B29C 48/2556* (2019.02); *B29C 48/345* (2019.02); *B32B 1/00* (2013.01); *B32B 15/08* (2013.01); *B29K 2103/08* (2013.01); *B29K 2105/0097* (2013.01); *B29L 2031/712* (2013.01); *B32B 2307/732* (2013.01); *B32B 2439/00* (2013.01)

(58) Field of Classification Search

CPC ........ B29K 2105/0097; B29K 2103/08; B29C 48/21; B29C 48/2556; B29C 48/08; B29C 48/345; B29C 48/154; B29C 48/022

See application file for complete search history.

(56) References Cited

U.S. PATENT DOCUMENTS

| | | | |
|---|---|---|---|
| 5,911,937 | A | 6/1999 | Hekal |
| 6,063,503 | A | 5/2000 | Hatakeyama et al. |
| 6,080,350 | A | 6/2000 | Hekal |
| 6,124,006 | A | 9/2000 | Hekal |
| 6,130,263 | A | 10/2000 | Hekal |
| 6,194,079 | B1 | 2/2001 | Hekal |
| 6,214,255 | B1 | 4/2001 | Hekal |
| 6,486,231 | B1 | 11/2002 | Hekal |
| 7,005,459 | B2 | 2/2006 | Hekal |
| 7,476,416 | B2 | 1/2009 | Tynan, Jr. et al. |
| 8,142,603 | B2 | 3/2012 | Sagona et al. |
| 9,902,788 | B2 | 2/2018 | Klein et al. |

| | | | | |
|---|---|---|---|---|
| 2001/0009718 | A1 | 7/2001 | Sinsel | |
| 2002/0168532 | A1 | 11/2002 | Sinsel et al. | |
| 2008/0283184 | A1 | 11/2008 | Sagona et al. | |
| 2012/0135191 | A1 | 5/2012 | Spangler et al. | |
| 2014/0287174 | A1 | 9/2014 | Klein et al. | |
| 2016/0039955 | A1 | 2/2016 | Klein et al. | |
| 2017/0028605 | A1 | 2/2017 | Ravishankar et al. | |
| 2017/0341351 | A1* | 11/2017 | Iwasaki | B32B 27/365 |
| 2018/0312667 | A1 | 11/2018 | Colgrove et al. | |
| 2020/0016034 | A1 | 1/2020 | Voellmicke | |

FOREIGN PATENT DOCUMENTS

| | | | | |
|---|---|---|---|---|
| CN | 105073876 | A | 11/2015 | |
| EP | 1121190 | A1 | 8/2001 | |
| GB | 1282876 | A | 7/1972 | |
| JP | 109-085830 | A | 3/1997 | |
| JP | H09-234832 | A | 9/1997 | |
| JP | 2002206046 | A | 7/2002 | |
| JP | 2006327690 | A * | 12/2006 | B32B 15/20 |
| JP | 2010274662 | A | 12/2010 | |
| JP | 2014050988 | A | 3/2014 | |
| JP | 2016513748 | A | 5/2016 | |
| WO | 1997032663 | A1 | 9/1997 | |
| WO | 9963288 | A1 | 12/1999 | |
| WO | 0009848 | A2 | 2/2000 | |
| WO | 03033237 | A1 | 4/2003 | |
| WO | 2005049750 | A2 | 6/2005 | |
| WO | 2010002764 | A1 | 1/2010 | |
| WO | 2018089933 | A1 | 5/2018 | |
| WO | 2018/161091 | A1 | 9/2018 | |
| WO | WO-2019172953 | A1 * | 9/2019 | B32B 37/153 |

OTHER PUBLICATIONS

Written Opinion issued in PCT/US2021/071090, mailed Nov. 22, 2021.

International Search Report issued in PCT/US2018/020978, mailed Aug. 3, 2018.

Written Opinion issued in PCT/US2018/020978, mailed Aug. 3, 2018.

International Search Report issued in PCT/US2018/049518, mailed Feb. 4, 2019.

International Search Report issued in PCT/US2018/049578, mailed Feb. 4, 2019.

* cited by examiner

METHODS FOR DISPENSING AND FORMING 3A MOLECULAR SIEVE HOT MELT ENTRAINED POLYMERS ONTO SUBSTRATES

CROSS-REFERENCE TO RELATED APPLICATIONS

This application is a Continuation application claiming priority from PCT International Application No. PCT/US2021/071090, filed Aug. 3, 2021, which claims priority to U.S. Provisional Application No. 63/060,319, entitled "METHODS FOR DISPENSING AND FORMING 3 A MOLECULAR SIEVE HOT MELT ENTRAINED POLYMERS ONTO SUBSTRATES," filed on Aug. 3, 2020, the contents of which are incorporated herein by reference in their entirety.

BACKGROUND OF THE INVENTION

1. Field of Invention

This disclosure relates to methods for extruding a hot melt adhesive comprising an entrained polymer, optionally in an in-line production process. More particularly, the disclosed concept relates to applying and adhering molten desiccant polymer formulations comprising 3 A molecular sieve, to a substrate having a surface. The surface includes a material compatible with the molten active polymer formulation so as to facilitate a thermal bond thereto.

2. Description of Related Art

There are many items that are preferably stored, shipped and/or utilized in an environment that must be controlled and/or regulated. For example, in the moisture control field, containers and/or packages having the ability to absorb excess moisture trapped therein have been recognized as desirable. The control of moisture may be desirable in medical, electronics and food packaging applications.

Conventionally, desiccants, oxygen absorbers and other active agents have been used in raw form, e.g., as loose particulates housed in sachets or canisters within packaging, to control the internal environment of the package. For many applications, it is not desired to have such loosely stored active substances. To address this problem, the assignee of the present application had developed active entrained polymers comprising active agents, wherein such polymers can be extruded and/or molded into desired forms, e.g., container liners, plugs, film sheets, pellets and other such structures. Optionally, such active entrained polymers may include channeling agents, such as polyethylene glycol (PEG), which form channels between the surface of the entrained polymer and its interior to transmit a selected material (e.g., moisture) to the entrained active agent (e.g., desiccant to absorb the moisture). Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth.

For some packages, e.g., pouches or blister packs, it is desired to adhere an entrained polymer film or layer to a substrate (e.g., another polymer or a foil) to form the package. One way to do so is by applying an adhesive to the film or layer during production to adhere it to the substrate. This may not be desirable because it requires a step of applying a separate adhesive and the adhesive may include solvents that can be deleterious to the package contents. An alternative is through a heat staking method which does not require application of a separate adhesive to adhere the entrained polymer film or layer to the substrate. As described in U.S. Pat. No. 8,142,603, which is incorporated by reference herein in its entirety, the heat staking method comprises the steps of: heating a foil substrate; applying an entrained polymer film to the foil; and applying sufficient pressure to the film and foil combination and sufficient heat to the foil so that the film adheres to the foil.

Heat staking is an improvement over use of conventional adhesives to adhere entrained polymer film to a substrate. However, in large scale production, heat staking typically requires providing formed film in bulk and applying a cutting step or providing pre-cut film. This may not always be desired by a package manufacturer, labeler or filler. There is a need for in-line production methods for applying and adhering a formed entrained polymer to a substrate without having to provide the entrained polymer in a preformed or precut shape. Ideally, the method would not require use of a separate adhesive material to adhere the entrained polymer to the substrate.

Applicant had developed novel methods for forming and adhering an entrained polymer structure in a predetermined shape to a substrate by dispensing the entrained polymer in hot melt form directly to the substrate. These methods and associated equipment are described in Applicant's International Patent Application Publication Nos. WO 2018/161091 and WO 2019/172953, each of which is incorporated by reference herein in its entirety. WO 2019/172953 discloses such hot melt methods using mineral entrained polymer formulations that comprise molecular sieve 4 A. The suffix "A" in "4 A" refers to the measurement of the microscopic pores of the molecular sieve, in angstroms.

Through subsequent testing, Applicant has found that these desiccant entrained polymers comprising the 4 A molecular sieve tend to generate small bubbles after a certain number of instances of dispensing, resulting in spattering and inconsistent flow. It can also create holes in the final product. This will not necessarily result in a defect for every entrained polymer structure dispensed. However, the hot melt dispensing methods are preferably used for mass production, which would be frustrated by such defects. Accordingly, there is a need for hot melt desiccant entrained polymer formulations and related methods that avoid these problems.

BRIEF SUMMARY OF THE INVENTION

Applicant has surprisingly found that the use of 3 A molecular sieve in the entrained polymer formulations for hot melt dispensing do not generate the problematic bubbles, as described in the Background, above, with respect to use of 4 A molecular sieve for hot melt dispensing.

Accordingly, in one aspect, a method is provided for forming and adhering an entrained polymer structure to a substrate. The method includes providing a substrate configured to receive application of an entrained polymer in molten form, wherein the entrained polymer comprises a base polymer, 3 A molecular sieve and optionally a channeling agent. The method further includes applying the entrained polymer in molten form in a predetermined shape to a surface of the substrate, to form thereon a solidified entrained polymer structure. The solidified entrained polymer structure is a monolithic material. The surface of the substrate is compatible with the entrained polymer in molten form so as to thermally bond with it and to adhere to it. The entrained polymer solidifies upon sufficient cooling to form the monolithic material. Preferably, the solidified entrained polymer structure adheres to the substrate without use of a separate adhesive material.

Optionally, in another aspect, a method is provided for forming and adhering an entrained polymer structure to a substrate. The method includes providing a substrate configured to receive application of an entrained polymer in molten form. The entrained polymer comprises a base polymer, 3 A molecular sieve and a channeling agent. The method further includes applying the entrained polymer in molten form in a predetermined shape to a surface of the substrate, to form thereon, upon sufficient cooling, a solidified entrained polymer structure. The solidified entrained polymer structure is a monolithic material. The surface of the substrate is compatible with the entrained polymer so as to thermally bond with it and adhere to it upon formation of the solidified entrained polymer structure. The solidified entrained polymer structure has passages formed of the channeling agent that penetrate through the base polymer.

Optionally, in any embodiment, the method forms and adheres precisely shaped entrained polymer structures to a substrate in an automated package production line. The method includes extruding an entrained polymer composition in molten form. The entrained polymer composition is made from a mixture of a base polymer and 3 A molecular sieve. Optionally, the 3 A molecular sieve is from 30% to 80% by weight of the entrained polymer. A substrate is provided. The substrate has a surface with a polymer sealing layer for receiving application of the entrained polymer composition. The method includes repeatedly applying the entrained polymer composition in molten form in predetermined shapes to the surface of the substrate. Each predetermined shape of entrained polymer composition in molten form adheres to the polymer sealing layer by thermal bonding, forming a precisely shaped entrained polymer structure upon cooling and solidification of the entrained polymer composition.

Optionally, in any embodiment, the substrate is movably conveyed in a linear direction when the entrained polymer composition in molten form is applied to the surface of the substrate.

Optionally, in any embodiment in which a channeling agent is not used, the entrained polymer is a two-phase formulation.

Optionally, in any embodiment, the entrained polymer is a three-phase formulation.

Optionally, in any embodiment, the substrate is a foil and the surface of the substrate comprises a polymer sealing layer on the foil.

Optionally, in any embodiment, the method is carried out using a hot melt dispensing apparatus. The apparatus includes a feeder for providing a flow of mineral entrained polymer in molten form. The feeder is optionally an extruder. The apparatus further includes one or more hoses, each of which having an internal lumen in fluid communication with an exit of the feeder to receive flow of the mineral entrained polymer in molten form. The lumen terminates at an applicator to which the entrained polymer in molten form is conveyed. The applicator includes a dispenser for applying the entrained polymer in the predetermined shape to the surface of the substrate.

Optionally, in any embodiment, the lumen is heated to maintain a molten state of the entrained polymer when conveyed through the lumen.

Optionally, in any embodiment, the dispenser is heated to maintain a molten state of the entrained polymer and to facilitate precise formation of the entrained polymer into the predetermined shape.

Optionally, in any embodiment, the dispenser includes a valve that alternates between a closed state and an open state so as to precisely form the entrained polymer structure in the predetermined shape. When such a valve is open, the dispensing may occur and when it is closed, the dispensing ceases. The opening and closing of the valve is repeated to produce respective precisely shaped solidified entrained polymer structures adhered to a substrate in an automated package production process.

Optionally, in any embodiment, the 3 A molecular sieve is a granular material that is more abrasive than the base polymer.

Optionally, in any embodiment, one or both of the substrate and solidified entrained polymer structure are flexible materials.

Optionally, in any embodiment, solid entrained polymer pellets are provided into the feeder and melted to form the entrained polymer in molten form.

Optionally, in any embodiment, the solidified entrained polymer structure is in the form of: a sheet, a film, a bead, a dot, a strip or a swirl. Optionally, the solidified entrained polymer structure is a piece of film in a flexible package, e.g., pouch. Optionally, the solidified entrained polymer structure is a piece of film in a blister compartment of a blister pack. Optional embodiments of blister packs are described in U.S. Pat. Pub. 2020/0016034 to Voellmicke, which is incorporated by reference herein in its entirety. A blister pack typically includes a foil backing with a polymer (e.g., thermoformed) cover. The cover can be attached or bonded to the foil backing to form a sealed unit package for containing a product. The cover can have at least one blister cavity, e.g., a domed portion, with an open side. A base portion on the foil side of each blister cavity may serve as the substrate for a piece of film made form the solidified entrained polymer structure disclosed herein.

Optionally, in any embodiment, the solidified entrained polymer structure is in the form of a film having a thickness of from 0.1 mm to 1.5 mm, optionally from 0.1 mm to 1.2 mm, optionally from 0.1 mm to 1.0 mm, optionally from 0.2 mm to 0.8 mm, optionally from 0.3 mm to 0.7 mm.

Optionally, in any embodiment, if the substrate is a foil, the surface of the substrate comprises a polymer sealing layer on the foil. Optionally, in any embodiment, the substrate is a portion of a package for a moisture-sensitive product, optionally wherein the package is a flexible package, a pouch or a blister pack.

Optionally, in any embodiment, the method is carried out as part of an automated, in-line package production process.

Optionally, in any embodiment, the solidified entrained polymer structure adheres to the substrate without use of a separate adhesive material.

Optionally, in any embodiment, the 3 A molecular sieve active agent is from 30% to 80%, optionally from 30% to 75%, optionally from 30% to 70%, optionally from 35% to 70%, optionally from 40% to 65%, optionally from 45% to 55%, by weight of the entrained polymer.

Optionally, in any embodiment, the solidified entrained polymer structure comprises an outer perimeter, wherein the surface of the substrate extends outwardly beyond at least a portion of the outer perimeter, optionally beyond the entire outer perimeter, i.e., in all directions.

Optionally, in any embodiment, the entrained polymer includes a flow agent that helps to modify the melt flow index and/or viscosity of the hot melt composition. The flow agent is not limited to, but is optionally selected from one or more of the following: a polyolefin, a polyolefin derivative, a natural wax, a synthetic wax, polyethylene, a polyethylene derivative, ethylene bis(stearamide), and cetyl palmitate. Optionally, where a flow agent is used, the flow agent is present in a range of from 0.25% to 10%, optionally from 0.25% to 6%, optionally from 0.25% to 4%, optionally from 0.5% to 3%, optionally about 1%, optionally about 2%, optionally about 3%, optionally about 4%, optionally about 5%, optionally about 6% by weight with respect to the total weight of the entrained polymer composition.

Optionally, in any embodiment, the molten entrained polymer composition has a melt flow index in a range from 200 g/10 min to 5000 g/10 min, optionally from 500 g/10 min to 4500 g/10 min, optionally from 1000 g/10 min to 4000 g/10 min, optionally from 1200 g/10 min to 2500 g/10 min under the ASTM D1238/ISO 1133 conditions.

Optionally, in any embodiment, the molten entrained polymer composition has a viscosity in a range from 1,000 cp to 50,000 cp, optionally from 3,000 cp to 40,000 cp, optionally from 3,000 cp to 20,000 cp, optionally from 3,000 cp to 15,000 cp, optionally from 3,000 cp to 10,000 cp, wherein the viscosity is measured with a rheometer at 190° C. after shearing at 5 Hz for two minutes.

Optionally, in any embodiment, the molten entrained polymer exhibits a melt flow index (MFI) of greater than 500 g/10 min (ASTM D1238/ISO 1133 standard method at 190° C. and 2.16 kg).

Optionally, in any embodiment, the molten entrained polymer exhibits a viscosity of less than 40,000 cP (analyzed using a rheometer with parallel plate geometry, 190° C., shear rate 5 Hz for two minutes).

Optionally, in any embodiment, a composite is made according to methods disclosed herein. The composite includes the substrate and the solidified entrained polymer structure adhered thereto. Optionally, in any embodiment, the composite is a portion of a flexible package, pouch or blister pack.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Definitions

Figure 1:
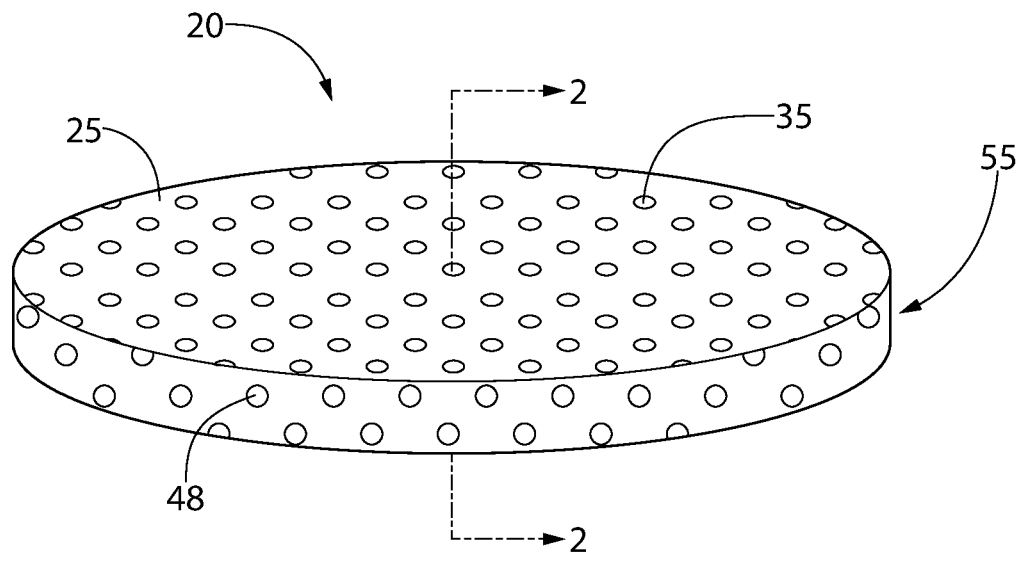
FIG. 1 is a perspective view of a plug formed of an entrained polymer that may be deposited onto a substrate according to methods of the disclosed concept.

As used herein, the term "active" is defined as capable of acting on, interacting with or reacting with a selected material (e.g., moisture or oxygen). Examples of such actions or interactions may include absorption, adsorption or release of the selected material.

As used herein, the term "active agent" is generally defined as a material that (1) is immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb or release the selected material(s). Unless otherwise explicitly stated herein, the active agent used in accordance with the disclosed concept is 3 A molecular sieve.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a material formed of at least a base polymer with an active agent and optionally also a channeling agent entrained or distributed throughout. When an entrained polymer in molten form is then cooled and solidified, it forms a monolithic composition. An entrained polymer thus includes two-phase polymers and three phase polymers. An entrained polymer having an active agent that is mineral in form is referred to herein as a "mineral entrained polymer".

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is distributed throughout, to give the structure or composition it's monolithic characteristics.

As used herein, the term "selected material" is defined as a material that is acted upon, by, or interacts or reacts with an active agent and is capable of being transmitted through the channels of the entrained polymer. For example, in embodiments in which a desiccant is used as an active agent, the selected material may be moisture which can be absorbed or adsorbed by the desiccant.

As used herein, the term "three phase" is defined as a monolithic composition or structure comprising three or more phases. An example of a three phase composition that may be used according to the disclosed concept would be an entrained polymer formed of a base polymer, active agent, and channeling agent. Optionally, a three phase composition or structure may include an additional phase, e.g., a colorant.

As used herein, the term "3 A molecular sieve" refers to a molecular sieve material having microscopic pores that measure 3 angstroms in size, as distinct, for example, from 4 A molecular sieve. "3 A molecular sieve" as used herein, is to be understood consistent with its meaning to a person of ordinary skill in the field of desiccants used, e.g., in packaging applications.

Entrained Polymers Suitable for Methods According to the Disclosed Concept

One of the difficulties in processing molten particulate or mineral entrained polymers in a hot melt application, is providing a substantially consistent shear of the molten material conveyed through an extruder and thereafter maintaining the molten state of the material through the point of dispensing. This would not typically be problematic for a simple "one phase" polymer or a mixture of molten polymers. However, including a granular, abrasive mineral component in the formulation, such as a typical desiccant (e.g., molecular sieve or silica gel), introduces complexity to the process. Such granular mineral components interfere with achieving the consistent shear necessary to convey the entrained polymer through the extruder and to maintain it in a molten state when dispensed in a hot melt application, so as to apply the molten entrained polymer in a precise predetermined shape to a surface of a substrate to form thereon a solidified entrained polymer structure (e.g., film). Those problems are particularly acute when the granular mineral components are at high loading levels.

From the perspectives of materials science and fluid mechanics, the viscosity of the molten entrained polymer is known to vary and decreases with increasing shear rate. This non-Newtonian, pseudoplastic material creates challenges in mixing and handling as its thixotropic structure progressively breaks down on shearing and slowly rebuilds at rest. The term "thixotropic structure" is based on the following definition for "thixotropy": a term used in rheology which means that the viscosity of material decreases significantly with the time of shearing and then, increases significantly when the force introducing the flow is removed.

The inventors have found that a particulate or mineral entrained polymer in accordance with U.S. Pat. No. 7,005,459 is difficult to process for hot melt applications using standard tank melting systems, because no shear is introduced in the standard tank melting systems; rather, only heat is used. In the absence of shear thinning, the high viscosity at low shear stress is too great and thus will not allow the material to flow/dispense as its thixotropic behavior wants to resist any flowing. The high viscosity is compounded by the high density of the particulate or mineral entrained polymer. A particulate or mineral entrained polymer compound in molten form requires constant pressure and shearing through an extruder for flowing to occur, which may be facilitated using a pressurized tank melting system. A pressurized tank melting system uses a pneumatic cylinder to push a plate against the entrained polymer.

In addition to the challenges described above, the rheology of the molten entrained polymer needs to enable clean melt filament formation upon discharge onto the surface of the substrate. Otherwise, the resulting defects, such as angel hair and tails, render the dispensing process inefficient and costly. Further, for effective bonding to the surface of the substrate, the entrained polymer and the surface of the substrate need to be chemically compatible.

The inventors have developed entrained polymer compositions for an in-line hot melt process utilizing an extruder, and an applicator to efficiently dispense the molten entrained polymer in a predetermined shape to the surface of a substrate.

In any embodiment, the entrained polymer composition comprises at least a base polymer material and an active agent. Optionally, the entrained polymer composition comprises at least a base polymer material, an active agent, and a channeling agent.

Optionally, the base polymer material comprises a base polymer and an optional additive.

Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

The optional additive may be a filler, a flow agent, a colorant, a plasticizer, or a stabilizer. Optionally, if the additive is a flow agent, the flow agent is a low molecular weight polyolefin, a low molecular weight oligomeric olefin, a polyolefin, or a modified polyolefin. Alternatively, the flow agent may be a natural, derived or synthetic wax. Naturally occurring waxes include animal, vegetable and mineral types, with the most common being the microcrystalline and paraffin mineral types. Synthetic waxes are polyethylene, polypropylene and Fischer-Tropsch waxes. These waxes may be homopolymers, where the polymer chain is based upon one monomer unit, such as ethylene, or they may be copolymers based upon two or more units, such as ethylene and vinyl acetate. Synthetic homopolymers or copolymers may also be functionalized in a modification step. The types of wax are not particularly limited in the chemical structure. In an optional embodiment, the flow agent is a paraffin, a low molecular weight polyethylene, a low molecular weight polyethylene derivative, ethylene bis(stearamide) (EBS), or cetyl palmitate.

Suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

It is believed that the higher the active agent concentration in the mixture, the greater the absorption or adsorption (as the case may be) will be of the final composition. However, too high an active agent concentration could cause the entrained polymer to be more brittle, and the molten mixture of active agent, base polymer material and channeling agent to be more difficult to either thermally form, extrude or injection mold.

In one embodiment, the active agent loading level can range from 10% to 80% including any sub-range or value encompassed within by weight with respect to the total weight of the entrained polymer. In an optional embodiment, the active agent loading is no less than 20%, optionally no less than 30%, optionally no less than 40%, optionally no less than 50% by weight with respect to the total weight of the entrained polymer. In another optional embodiment, the active agent loading is no more than 70%, optionally no more than 60%, optionally no more than 50% by weight with respect to the total weight of the entrained polymer. In another optionally embodiment, the active agent loading is from 20% to 80%, optionally from 20% to 60%, optionally from 20% to 50%, optionally from 20% to 40%, optionally from 30% to 80%, optionally from 30% to 60%, optionally from 30% to 50%, optionally from 30% to 40%, optionally from 40% to 80%, optionally from 40% to 60%, optionally from 40% to 50%.

Optionally, the channeling agent may be provided in a range of 1% to 15% including any sub-range or value encompassed within by weight of the entrained polymer. In an optional embodiment, the channeling agent may be provided at a range from 1% to 12%, optionally from 1% to 10%, optionally from 1% to 8%, optionally from 1% to 6%, optionally from 1% to 5%, optionally from 1% to 4%, optionally from 1% to 3%, optionally from 2% to 12%, optionally from 2% to 10%, optionally from 2% to 8%, optionally from 2% to 6%, optionally from 2% to 5%, optionally from 2% to 4%, optionally from 2% to 3%, optionally from 3% to 8%, optionally from 3% to 6%, optionally from 3% to 5%, optionally from 3% to 4%, optionally from 4% to 8%, optionally from 4% to 6%, optionally from 4% to 5%. Optionally, the channeling agent may be provided at about 1%, 2%, 3%, 4%, 5%, 6%, 7%, 8%, 9%, 10%, 11% or 12% by weight of the entrained polymer.

Optionally, the base polymer may range from 10% to 70% including any sub-range or value encompassed within by weight of the entrained polymer. In an optional embodiment, the base polymer is no less than 20%, optionally no less than 30%, optionally no less than 40% by weight with respect to the total weight of the entrained polymer. In another optional embodiment, the base polymer is no more than 40%, optionally no more than 30% by weight with respect to the total weight of the entrained polymer. In another optional embodiment, the base polymer may range from 15% to 40%, optionally 20% to 35%, optionally 25% to 30% by weight of the entrained polymer.

Optionally, if used, the flow agent may range from 0.25% to 10% and any sub-range or value encompassed within by weight of the entrained polymer. Optionally, a colorant is added, e.g., at about 2% by weight of the total weight of the entrained polymer.

The molten entrained polymer suitable for an in-line melt adhesion process of the current invention can also be characterized by its melt flow index (MFI). Typically, a base polymer such as a polypropylene, has an MFI of about 12 g/10 min (ASTM D1238/ISO 1133 standard conditions, omitted hereafter in relation to MFI). A sample desiccant entrained polymer consistent with the disclosure in U.S. Pat. No. 7,005,459 has an MFI below 12 g/10 min. The entrained polymer of the invention optionally has an MFI ranging from 200 g/10 min to 5000 g/10 min. In an optional embodiment, the MFI of the entrained polymer is no less than 500 g/10 min, optionally no less than 1000 g/10 min, optionally no less than 1500 g/10 min, optionally no less than 2000 g/10 min. In another optional embodiment, the MFI of the entrained polymer is no more than 4000 g/10 min, optionally no more than 3500 g/10 min, optionally no more than 3000 g/10 min, optionally no more than 2500 g/10 min. In another optional embodiment, the MFI of the entrained polymer is in the range from 500 g/10 min to 4000 g/10 min, optionally from 500 g/10 min to 3500 g/10 min, optionally from 500 g/10 min to 3000 g/10 min, optionally from 500 g/10 min to 2500 g/10 min, optionally from 500 g/10 min to 2000 g/10 min, optionally from 500 g/10 min to 1500 g/10 min, optionally from 1000 g/10 min to 4000 g/10 min, optionally from 1000 g/10 min to 3500 g/10 min, optionally from 1000 g/10 min to 3000 g/10 min, optionally from 1000 g/10 min to 2500 g/10 min, optionally from 1000 g/10 min to 2000 g/10 min, optionally from 1000 g/10 min to 1500 g/10 min, optionally from 1200 g/10 min to 4000 g/10 min, optionally from 1200 g/10 min to 3500 g/10 min, optionally from 1200 g/10 min to 3000 g/10 min, optionally from 1200 g/10 min to 2500 g/10 min, optionally from 1200 g/10 min to 2000 g/10 min, optionally from 1500 g/10 min to 4000 g/10 min, optionally from 1500 g/10 min to 3500 g/10 min, optionally from 1500 g/10 min to 3000 g/10 min, optionally from 1500 g/10 min to 2500 g/10 min. The relatively high MFI facilitates the flow of the molten entrained polymer in the in-line dispensing and adhesion process.

The entrained polymer suitable for an in-line melt adhesion process of the current invention can additionally or alternatively be characterized by its viscosity. A sample desiccant entrained polymer consistent with the disclosure in U.S. Pat. No. 7,005,459 has a viscosity on the order of 100,000 cP (analyzed using a rheometer with parallel plate geometry, 190° C., shear rate 5 Hz for two minutes) (conditions used throughout and omitted hereafter in relation to viscosity). The entrained polymer of the current invention optionally has a viscosity ranging from 1,000 cP to 50,000 cP. In an optional embodiment, the viscosity of the entrained polymer is no more than 40,000 cp, optionally no more than 20,000 cP, optionally no more than 15,000 cp, optionally no more than 12,000 cp, optionally no more than 10,000 cp, optionally no more than 8,000 cp, optionally no more than 6,000 cp, optionally no more than 4,000 cp, optionally no more than 2,000 cp. In another optional embodiment, the viscosity of the entrained polymer is in a range from 3,000 cp to 40,000 cp, optionally from 3,000 cp to 30,000 cp, optionally from 3,000 cp to 20,000 cp, optionally from 3,000 cp to 15,000 cp, optionally from 3,000 cp to 12,000 cp, optionally from 4,000 cp to 40,000 cp, optionally from 4,000 cp to 30,000 cp, optionally from 4,000 cp to 20,000 cp, optionally from 4,000 cp to 15,000 cp, optionally from 4,000 cp to 12,000 cp, optionally from 6,000 cp to 40,000 cp, optionally from 6,000 cp to 30,000 cp, optionally from 6,000 cp to 20,000 cp, optionally from 6,000 cp to 15,000 cp, optionally from 6,000 cp to 12,000 cp, optionally from 8,000 cp to 40,000 cp, optionally from 8,000 cp to 30,000 cp, optionally from 8,000 cp to 20,000 cp, optionally from 8,000 cp to 15,000 cp, optionally from 8,000 cp to 12,000 cp, optionally from 10,000 cp to 40,000 cp, optionally from 10,000 cp to 30,000 cp, optionally from 10,000 cp to 20,000 cp, optionally from 10,000 cp to 15,000 cp, optionally from 10,000 cp to 12,000 cp, optionally from 12,000 cp to 40,000 cp, optionally from 12,000 cp to 30,000 cp, optionally from 12,000 cp to 20,000 cp, optionally from 12,000 cp to 15,000 cp. The relatively low viscosity facilitates the flow of the molten entrained polymer in the in-line dispensing and adhesion process.

The current invention provides an entrained polymer that is highly active, has good flow properties for large scale high throughput in-line application on a substrate, and enables precise control of dispense to form intricate patterns on a wide range of surfaces or enclosures. The in-line process may use a pre-formed monolithic entrained polymer as the starting material. However, the requisite components, such as base polymer, particular active agent, additive, and channeling agent, may also be mixed and heated to a molten form in the same process immediately prior to application on a substrate. Similarly, an intermediate material containing a subset of the requisite components may be mixed with other requisite component(s) to form the entrained polymer composition used in the in-line application process.

FIGS. 1-6 illustrate entrained polymers and various packaging assemblies formed of entrained polymers according to the disclosed concept. The entrained polymers each include a base polymer 25, a channeling agent 35 and an active agent 30. As shown, the channeling agent 35 forms interconnecting channels 45 through the entrained polymer. At least some of the active agent 30 is contained within these channels 45, such that the channels 45 communicate between the active agent 30 and the exterior of the entrained polymer via channel openings 48 formed at outer surfaces of the entrained polymer 25. While a channeling agent, e.g., 35, is preferred for certain applications, the disclosed concept broadly includes entrained polymers that optionally do not include channeling agents.

Referring to FIG. 1, an insert 20, constructed from the entrained polymer according to an optional embodiment is illustrated. The insert 20 is in the form of a plug 55 that may be deposited into a container or other enclosure, or deposited onto a substrate (e.g., foil).

Figure 2:
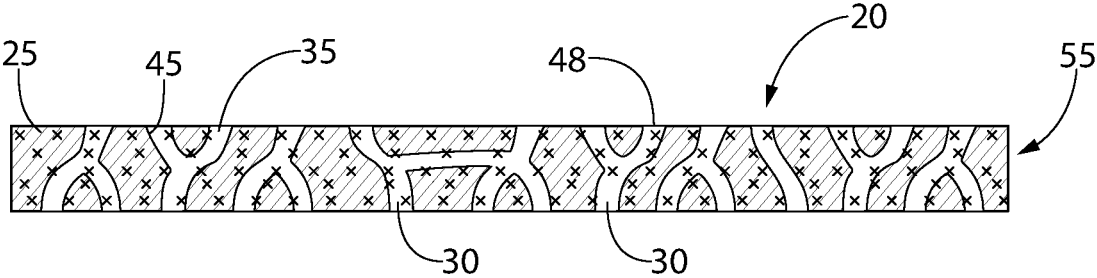
FIG. 2 is a cross section taken along line 2-2 of FIG. 1.

Referring to FIG. 2, a cross-sectional view is shown of the plug 55 that has been constructed from an entrained polymer comprising the base polymer 25 that has been uniformly blended with the active agent 30 and the hydrophilic agent or channeling agent 35. In the illustration of FIG. 2, the entrained polymer has been solidified so that interconnecting channels 45 have formed throughout the entrained polymer to establish passages throughout the solidified plug 55. As may be appreciated from both FIGS. 1 and 2, the passages terminate in channel openings 48 at exterior surfaces of the plug 55.

Figure 3:
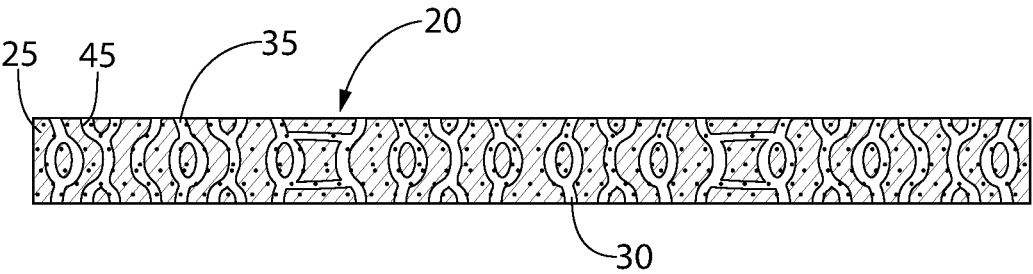
FIG. 3 is a cross section similar to that of FIG. 2, showing a plug formed of another embodiment of an entrained polymer that may be deposited onto a substrate according to methods of the disclosed concept.
Figure 4:
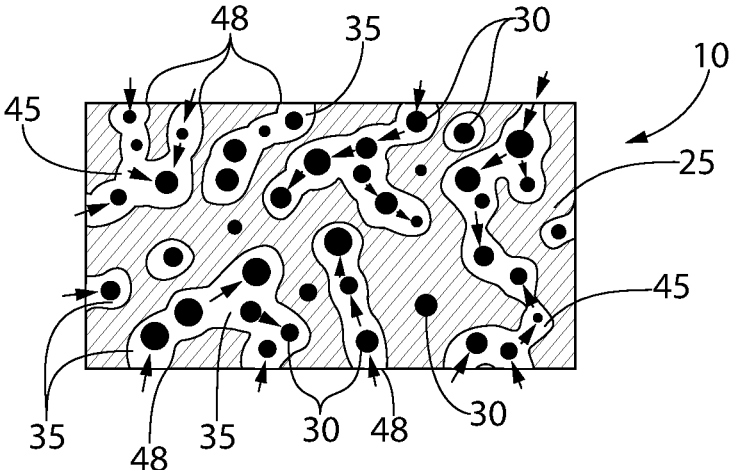
FIG. 4 is a schematic illustration of an entrained polymer that may be used according to methods of the disclosed concept.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer having a dimer agent added thereto, the interconnecting channels 45 which are formed therethrough have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally resists permeation of these materials, thus acting as a barrier thereto. For this reason, the base polymer 25 itself acts as a barrier substance within which an active agent 30 may be entrained. The interconnecting channels 45 formed of the channeling agent 35 provide pathways for the desired material to move through the entrained polymer. Without these interconnecting channels 45, it is believed that relatively small quantities of the desired material would be transmitted through the base polymer 25 to or from the active agent 30. In the case in which the desired material is transmitted to the active agent 30, it may be absorbed by the active agent 30.

Figure 5:
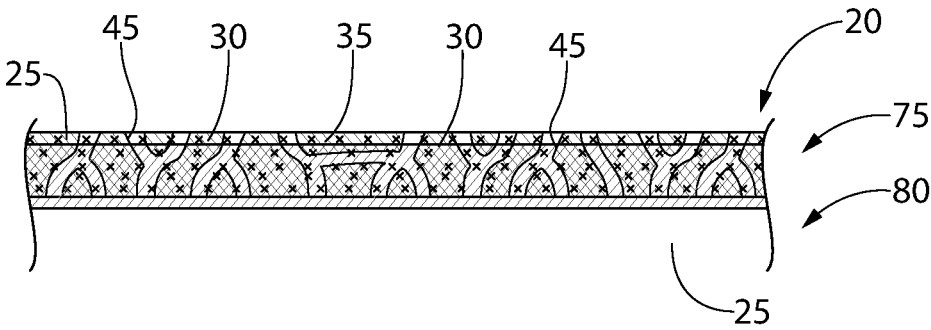
FIG. 5 is a cross sectional view of a sheet formed of an entrained polymer, adhered to a barrier sheet substrate according to methods of the disclosed concept.

FIG. 5 illustrates embodiments of an end product of optional methods according to the disclosed concept. An active sheet 75 formed of the entrained polymer of the invention is used in combination with a barrier sheet 80 to form a composite according to an aspect of the invention. The characteristics of the active sheet 75 are similar to those described with respect to the plug 55. The barrier sheet 80 may be a substrate such as foil and/or a polymer with low moisture or oxygen permeability. The substrate 80 is compatible with the active sheet 75 and is thus configured to thermally bond to the active sheet 75, when the active sheet solidifies after dispensing, as discussed below.

Figure 6:
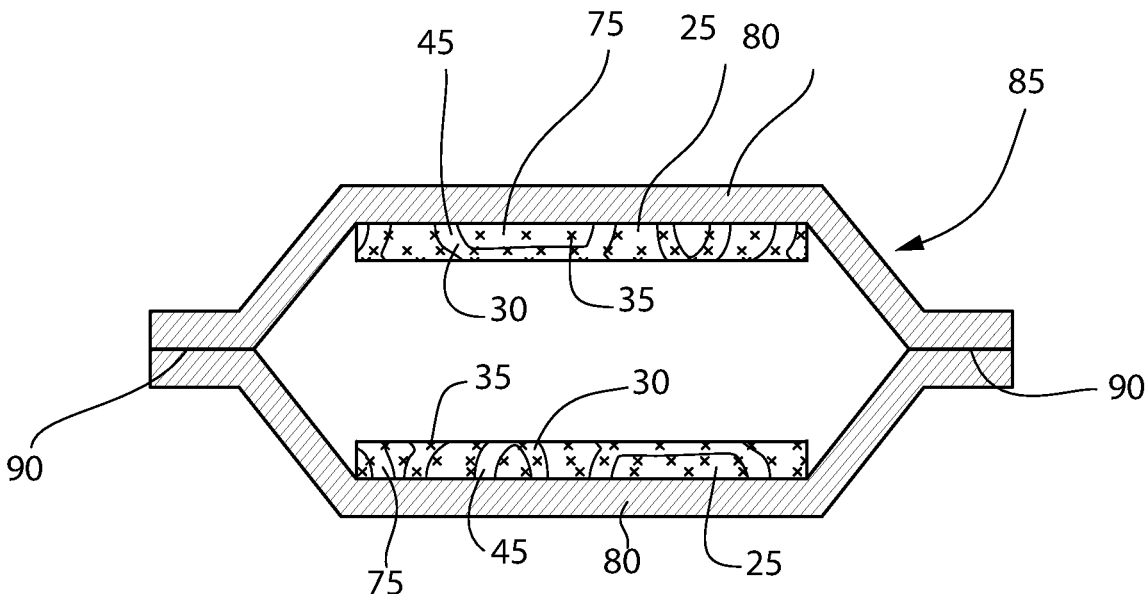
FIG. 6 is a cross section of a package that may be formed according to methods of the disclosed concept.

FIG. 6 illustrates an embodiment in which the entrained polymer structure 75 and the substrate 80 are combined to form a packaging wrap having active characteristics at an interior surface formed by the entrained polymer in the entrained polymer structure 75, and vapor resistant characteristics at an exterior surface formed by the barrier sheet or substrate 80. In this embodiment, the entrained polymer structure 75 occupies a portion of the barrier sheet or substrate 80. Methods according to the disclosed concept for making the entrained polymer structure 75 and adhering it to the substrate 80 are described below.

In one embodiment, the sheets of FIG. 5 are joined together to form an active package 85, as shown in FIG. 6. As shown, two laminates or composites are provided, each formed of an active sheet 75 joined with a barrier sheet 80. The sheet laminates are stacked, with the active sheets 75 facing one another, so as to be disposed on an interior of the package, and are joined at a sealing region 90, formed about a perimeter of the sealed region of the package interior.

One purpose of the entrained polymer of the current invention is for use in an in-line production process to apply a particulate or mineral entrained polymer to a compatible substrate and to adhere the (initially molten and subsequently solidified) entrained polymer to the substrate via a thermal bond. However, the use of the entrained polymer of the current invention is not so limited. The current invention provides a high density, high melt flow index, and low viscosity active polymer adaptable for a high-throughput in-line production process.

Exemplary Methods According to Optional Aspects of Disclosed Concept

Methods for applying and adhering an entrained polymer structure to a suitable substrate according to aspects of the disclosed concept will now be described.

The current invention also provides a method for forming and adhering an entrained polymer structure to a substrate, using the entrained polymer or the entrained polymer composition discussed above. The method is illustrated below, using as an example a pre-formed monolithic entrained polymer as the starting material.

First, the entrained polymer is introduced to a feeder. Heat is applied to convert the entrained polymer to a molten state.

Second, the flow of the entrained polymer in a molten state is conveyed to an applicator. Heat may be necessary along the flow path to maintain the flow rate and the plasticity of the molten entrained polymer.

Third, the molten entrained polymer is dispensed via a dispenser on a surface of a substrate in a desired pattern or shape. The loading is controlled in a precise manner via, for example, pneumatic pressure applied to the applicator, advance rate of substrate, and discharge time of dispenser. The surface compatibility enables bonding of the entrained polymer with the substrate. Upon sufficient cooling, the deposited entrained polymer solidifies and forms an entrained polymer structure on the surface of the substrate. The pattern or shape of the deposit is not particularly limited. For example, the entrained polymer structure may be in a form of a sheet, a film, a bead, a dot, a strip or a swirl.

The method is not limited to using pre-formed entrained polymer as the starting material. Likewise, the components of the entrained polymer may also be mixed and heated to form a molten composition sharing the same compositional features of the pre-formed entrained polymer.

The inventors have discovered certain adaptations to single screw extruder equipment and to processes for using the same that overcome these difficulties. The extruder, as with typical extruders, provides for transport and melting of feed and pressure build-up of melted polymer for dispensing. Typically, an extruder includes a hollow chamber with heating zones and a threaded shaft or screw which rotates along its central axis. The extruder typically includes a hopper at one end, which provides for feeding of polymer material into the extruder, typically in the form of 2-10 mm sized solid pellets.

Figure 7:
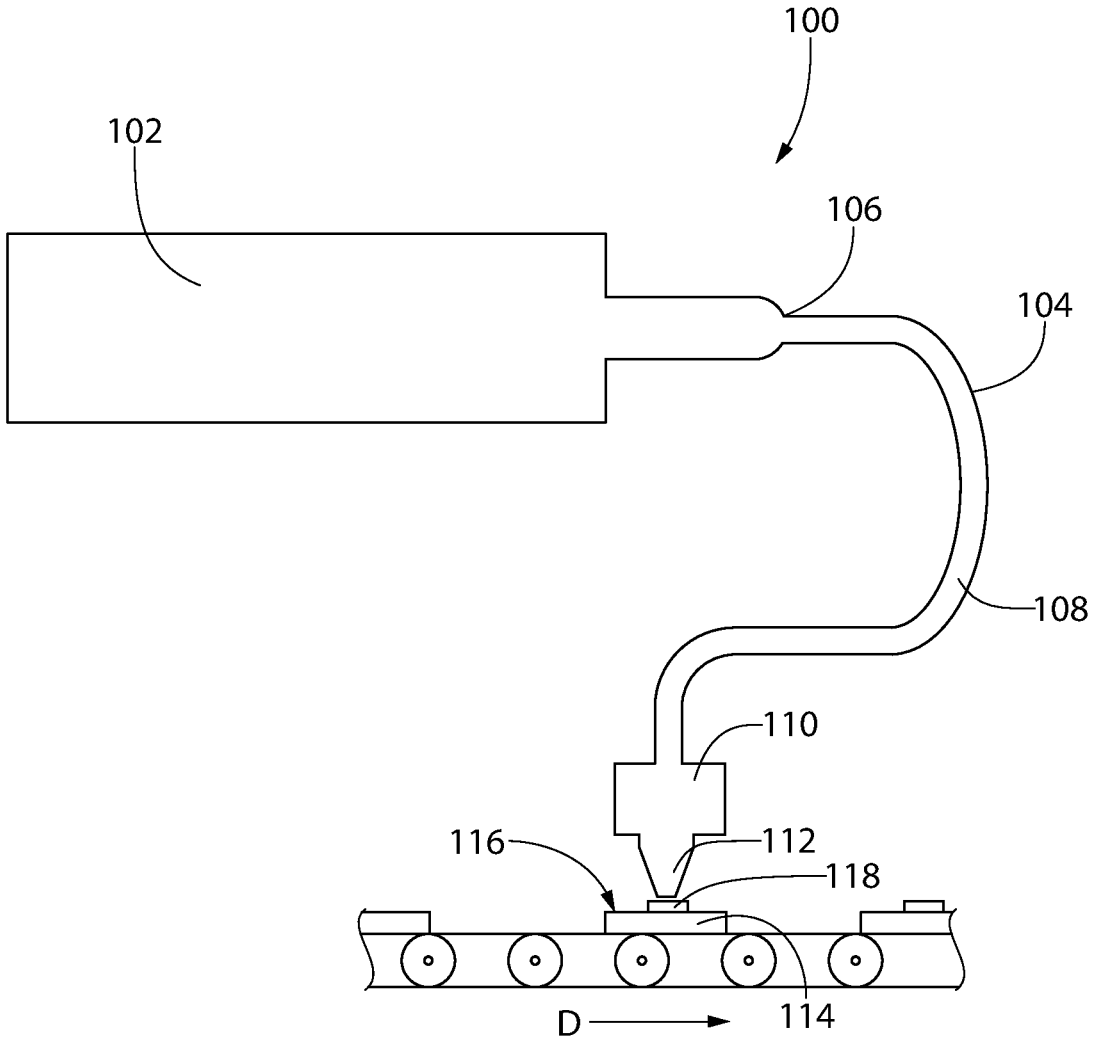
FIG. 7 is a schematic illustration of an optional embodiment of a hot melt dispensing apparatus delivering an entrained polymer in molten form to a substrate.

Referring now to FIG. 7, there is shown an optional embodiment of a hot melt dispensing apparatus 100 for carrying out methods for forming and adhering an entrained polymer structure to a substrate. The hot melt dispensing apparatus 100 includes a feeder 102 (optionally, an extruder or a loader) for providing a flow of particulate or mineral entrained polymer in molten form. The feeder 102 includes an exit 106 to which a hose 104 (optionally more than one hose) is coupled. The hose 104 includes an internal lumen 108 that is in fluid communication with the exit 106 to receive flow of the particulate or mineral entrained polymer in molten form. The lumen 108 terminates at an applicator 110 to which the entrained polymer in molten form is conveyed. The applicator 110 comprises a dispenser 112 configured to deliver the entrained polymer in molten form to a surface or enclosure in precise amounts and configurations (i.e., in a predetermined shape).

In the embodiment shown, the dispenser 112 has deposited a particulate or mineral entrained polymer in molten form to the surface 116 of a substrate 114, forming and adhering an entrained polymer structure 118 thereon. Optionally, the substrate 114 is a foil and the surface 116 is a polymer sealing layer (which is compatible with the base polymer material of the particulate or mineral entrained polymer) to help effectuate a thermal bond between the structure 118 and the surface 116. The lumen 108 and/or the dispenser 112 (preferably both) are heated to maintain a molten state of the entrained polymer when conveyed from the feeder 102, through the lumen 108 and out the dispenser 112. Heating the dispenser 112 in this way also may help facilitate precise formation of the entrained polymer into the predetermined shape.

Optionally, the method using the apparatus 100 is carried out as part of an automated, in-line production process. To facilitate this, for example, a conveyor belt may transport substrate 114 in a discontinuous or a continuous manner for automated depositing of molten entrained polymer thereon. For example, the conveyor belt may move in direction D (i.e., a linear direction) to transport the units or a sheet of substrate 114 as part of the in-line process. This is one optional way in which the substrate may be movably conveyed in a linear direction while the entrained polymer in molten form is applied thereto. The in-line process may be, for example, a package production process. The entrained polymer structure 118 and substrate 114 together form a composite, which may be a portion of a flexible package, pouch or blister pack, for example.

Optionally, the dispenser 112 comprises a valve that alternates between a closed state and an open state so as to precisely form the entrained polymer structure 118 in the predetermined shape. For example, the valve may open to dispense an entrained polymer structure in the form of a piece of film and then close to stop dispensing that piece of film before opening again to repeat. Optionally, the dispenser 112 comprises a hot melt precision slot-die extrusion coating head. This type of dispenser configuration may help ensure accurate heat distribution and stability, and provide precise repeatability. The entrained polymer will flow through a deposition nozzle of the dispenser because the applied shear thinning and pressure shears the bond and induces a breakdown in the material elasticity, therefore causing material to flow. The elasticity recovers immediately after leaving the nozzle and the entrained polymer solidifies to maintain its shape and strength. The result is a strip or other structure of a solidified entrained polymer that is configured to thermally bond to a compatible substrate.

Optionally, in any embodiment, a storage or material supply tank may be configured to store a pseudoplastic high viscosity material and supply the material (e.g., solid entrained polymer pellets) to a pump. The pump is configured to apply a force to the material by shear thinning the pseudoplastic high viscosity material to reduce material viscosity, thus causing the material to flow.

If an extruder is used to feed hot melt entrained polymer, means are required to position and dispense the material onto a substrate. This for example may be provided by a flexible or rigid hose that is connected to and in fluid communication with an exit of the extruder, as discussed above. The flexible hose includes a lumen through which the molten entrained polymer is conveyed, the lumen being heated preferably at or above the temperature of the polymer exiting the extruder. Such a high temperature is configured to prevent heat loss that could inhibit flow. The entrained polymer may flow through a deposition nozzle because the applied shear thinning and pressure shears the bond and induces a breakdown in the material elasticity therefore causing material to flow. The elasticity recovers immediately after leaving the nozzle and the entrained polymer solidifies to maintain its shape and strength. The result is a strip or other structure in a desired shape of a solidified entrained polymer that is configured to thermally bond to a compatible substrate.

Optionally, in any embodiment, the lumen 108 of the hose 104 that is in contact with the molten entrained polymer is heated to a temperature at or above that of the material exiting the extruder. Optionally, in any embodiment, the dispenser 112 is heated to maintain the molten state of the entrained polymer and to facilitate precise formation of the entrained polymer into the predetermined shape in the dispensing step. Optionally, in any embodiment, the apparatus 100 is incrementally heated such that the dispensed molten entrained polymer is in a heated and pliable state (in the form of a hot melt with inherent adhesive properties) in the dispensing step to facilitate controlled and variable dispensing onto the substrate 114. This may be achieved, for example, through heating the hoses and/or dispenser, as described above. Optionally, in any embodiment, the dispenser 112 is configured to be adaptable (e.g., with replacement heads) to dispense a variety of entrained polymer shapes and material volumes from a single material source as needed.

Optionally, in any embodiment, to integrate the method of the disclosed concept into a processing line, the molten entrained polymer composition of the present invention may be conveyed into a metering pump supplying the heated hoses and the use of pneumatically controlled dispensers to finitely control the dispensing. Optionally, processing feedback may be used to control the supply of material from the extruder to the metering pump and from the metering pump to the dispenser. For example, programmable logic controllers may be used to adjust the on/off and speed of the feeder (e.g., extruder) to maintain a supply of molten material to the metering pump(s). Optionally, a metering pump could be coupled to a manifold that would supply multiple heated hoses and dispensers.

The primary intended use of methods according to the invention are for applying a particulate or mineral entrained polymer (particularly comprising a 3 A molecular sieve active agent) to a compatible substrate to adhere the (initially molten and subsequently solidified) entrained polymer to the substrate via a thermal bond. However, alternative aspects of the invention may include methods for dispensing the entrained polymer to a substrate or into a compartment wherein a thermal bond is not created and alternative means of securing the entrained polymer and substrate are required. In such a case, much of the process in terms of running the material through the extruder and adaptations to the extruder equipment would be the same. However, a mechanical interlock, a tie layer between the entrained polymer and the substrate, an adhesive additive mixed into the polymer or some other means (as an alternative to a thermal bond) may be provided to secure the entrained polymer to the substrate or compartment. For example, in the electronics industry, a substrate or compartment may include electronic components and empty space surrounding the electronic components for which it is desired to provide an active material, e.g., entrained polymer. Rather than injection molding a separate part comprising an entrained polymer and then assembling such part to the substrate or compartment, methods according to an aspect of the disclosed concept would enable one to dispense and fill a desired space on a substrate or compartment with a particulate or mineral entrained polymer. Such an in-line process would obviate the need for a separate assembling step. In the event the substrate or compartment surface is incompatible with the entrained polymer such that no thermal bond can be formed, a mechanical interlock or structure may be provided to secure the solidified entrained polymer in place. For example, a cover may be placed over the substrate or compartment to form an assembly, thereby retaining the entrained polymer in place.

Exemplary Products According to Current Invention

The composite formed of the entrained polymer structure and the substrate adhered thereto may be a portion of a flexible package, pouch or blister pack. FIG. 6 shows an example of the products manufactured using the invented entrained polymer and methods of manufacture.

The invention will be illustrated in more detail with reference to the following Examples, but it should be understood that the invention is not deemed to be limited thereto.

Example 1

Desiccant entrained polymer samples according to Table 1 below, were prepared in the form of extruded pellets. The pellets were fed to an extruder assembly that was specially configured for and used in the hot-melt in-line process according to an optional aspect of the invented method. The melt flow index of the formulations that were dispensed and the quality of the dispensed material via the hot melt process are also recorded in Table 1.

TABLE 1

| Sample | Components | Wt % | Melt Flow Index[1] (g/10 min) | Dispense Outcome |
|---|---|---|---|---|
| 3A-1 | Molecular Sieve 3A | 50 | 1500 +/− 500 @ 190 C. | Excellent |
| | Carbowax 4000 | 2 | 150 +/− 50 @ 150 C. | Dispensed without gas |
| | LDPE | 24 | | bubbles |
| | PE 143 Wax | 24 | | |
| 3A-2 | Molecular Sieve 3A | 50 | 140 +/− 50 @ 150 C. | Excellent |
| | Carbowax 4000 | 2 | | Dispensed without gas |

TABLE 1-continued

| Sample | Components | Wt % | Melt Flow Index[1] (g/10 min) | Dispense Outcome |
|--------|-----------|------|-------------------------------|------------------|
| | LDPE | 36 | | bubbles |
| | PE 105 Wax | 12 | | |
| 3A-3 | Molecular Sieve 3A | 50 | 45 +/− 10 @ 190 C. | Excellent |
| | Carbowax 4000 | 2 | 30 +/− 5 @ 150 C. | |
| | LDPE | 48 | 10 +/− 2 @ 125 C. | Dispensed without gas |
| | | | 100 +/− 25 @ 200 C. | bubbles |

[1] Melt flow index was measured according to the ASTM D1238/ISO 1133 method.
[2] Carbowax 4000 is a type of polyethylene glycol, used as a channeling agent.
[3] LDPE is low density polyethylene, used as a base polymer.

The inventors reconfigured an extruder to create an extruder assembly and developed desiccant entrained polymer compositions to practice a method according to an optional aspect of the invention. The extruder assembly successfully extruded mineral entrained polymers from a pellet form, conveyed the molten material through a heated hose and dispensed it out of a heated hot melt gun or dispenser to form an entrained polymer structure adhered to a foil substrate.

A typical extruder would dispense directly through a die to produce a particular shape of material, e.g., solid or hollow strands or tubes. Uniquely, an extruder assembly according to the disclosed concept, included a heated hose coupled to the exit of the extruder and a heated dispenser coupled to the dispensing end of the hoses. The lumen of the hose was heated to a temperature at or above the material exiting the extruder so as to maintain the entrained polymer in a molten state as the polymer was conveyed under pressure from the extruder through the hose. Closing the dispenser allowed pressure to build up in the system. Opening and closing of the dispenser valve allowed the material to flow in a very controlled and precise manner. The base polymer used in the formulation was compatible with a polymer coating (polymer seal layer) on the foil substrate. This allowed the molten state of the mineral entrained polymer (which was further maintained via the heated dispenser) to mix and adhere to the coated substrate, due to similar properties of the contacting materials. The result was a solidified entrained polymer structure formed and adhered onto the foil substrate.

Moreover, it was found that the 3 A molecular sieve of the formulations in Table 1 provided excellent adhesion and repeatable precision of films dispensed onto a foil substrate without the bubbles that had been observed when testing formulations that included 4 A molecular sieve instead of 3 A molecular sieve. The bubbles were a problem because they could potentially affect the homogeneity and density of the entrained polymer, which could have a negative impact on its moisture capacity and uptake. For applications in which little space is available to apply a desiccant entrained polymer, repeatable precision is very important because a predetermined shape and size of the entrained polymer is configured to provide a certain specific moisture capacity. Small and even occasional defects attributable to the bubbles could be problematic. For example, if the entrained polymer is not formed in the precise shape and size desired (e.g., due to bubbles formed during the hot melt process), it will lack the mass that was calculated to be necessary for the application. The resulting moisture capacity could thus be altered. This could adversely affect the product that the desiccant is intended to protect during storage, thereby potentially leading to administration of a drug that has lost its potency or use of a diagnostic that does not function properly. Therefore, Applicant's discovery of the problem of the bubbles using other desiccants, and that the 3 A molecular sieve does not give rise to this problem, represents notable improvement in the art.

Figure 8:
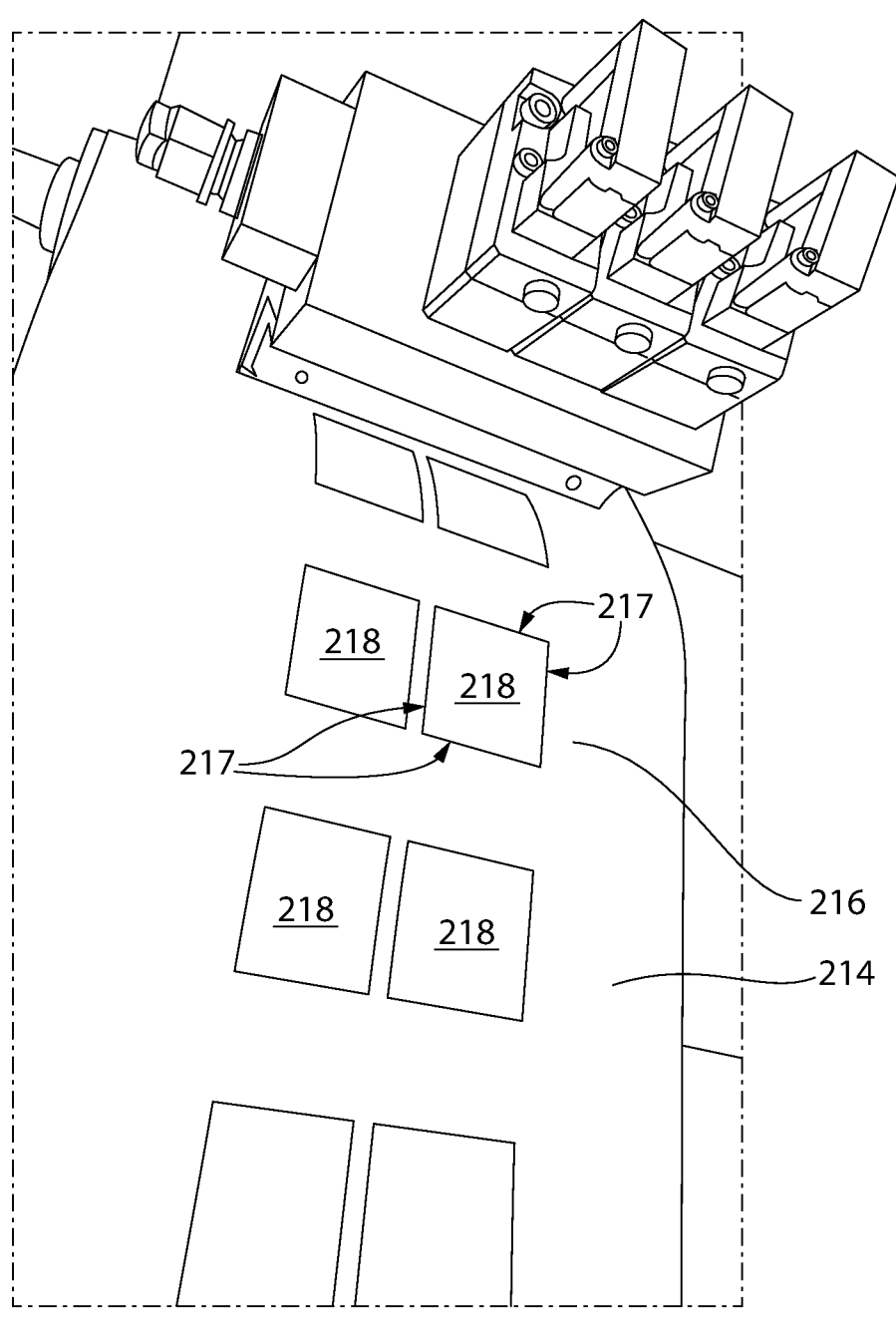
FIG. 8 is an isometric view of an optional embodiment of a hot melt dispensing apparatus dispensing entrained polymer structures in the form of identically shaped films that are adhered to a foil substrate, according to a process according to the disclosed concept.

FIG. 8 is an illustration of a plurality of entrained polymer films 218 being dispensed onto and automatically adhering to a foil substrate 214 using an optional embodiment of a hot melt dispensing apparatus. This illustration represents a snapshot of a method being carried out, for repeatedly forming and adhering precisely (and preferably identically) shaped and sized entrained polymer structures to a substrate in an automated package production line. This method involves repeatedly applying the entrained polymer composition in molten form in predetermined shapes (i.e., in the shape of the film 218) to the surface of the substrate (here, the foil substrate 214). Each predetermined shape of entrained polymer composition in molten form adheres to the polymer sealing layer by thermal bonding, forming a precisely shaped entrained polymer structure upon cooling and solidification of the entrained polymer composition. Each predetermined shape of entrained polymer in molten form is preferably provided in the same amount and configuration as another so as to render each entrained polymer structure to be the same size and shape as another. In this embodiment, the substrate 214 is movably conveyed in a linear direction when the entrained polymer composition in molten form is applied to the substrate 214.

Each solidified entrained polymer film 218 (or structure, generally) comprises an outer perimeter 217 wherein the surface 216 of the substrate 214 extends outwardly beyond at least a portion of the outer perimeter 217, optionally beyond the outer perimeter 217 in all directions (as shown in the figure). In other words, the surface 216 of the substrate 214 optionally extends beyond the entirety of the outer perimeter 217. Thus, the film 218 is not coextensive with the surface 216 of the substrate.

While the invention has been described in detail and with reference to specific examples thereof, it will be apparent to one skilled in the art that various changes and modifications can be made therein without departing from the spirit and scope thereof.

What is claimed is:

1. A method for forming and adhering an entrained polymer structure to a substrate, comprising the steps of:
   a. providing the substrate, which is configured to receive application of an entrained polymer composition in molten form, wherein the entrained polymer composition comprises a base polymer and 3 A molecular sieve; and
   b. applying the entrained polymer composition in molten form in a predetermined shape to a surface of the substrate, to form thereon a solidified entrained polymer structure, the solidified entrained polymer structure being a monolithic material, wherein the surface of the substrate is compatible with the entrained polymer composition in molten form so as to thermally bond therewith and to adhere thereto, and wherein the entrained polymer composition solidifies upon sufficient cooling to form the monolithic material.

2. The method of claim 1, wherein the entrained polymer composition comprises a channeling agent, the solidified entrained polymer structure comprising passages formed of the channeling agent that penetrate through the base polymer and may be interconnected with each other.

3. The method of claim 1, wherein the substrate is a foil and the surface of the substrate comprises a polymer sealing layer on the foil.

4. The method of claim 1, wherein the method is carried out using a hot melt dispensing apparatus comprising: an extruder for providing a flow of mineral entrained polymer composition in molten form; one or more hoses, each hose having an internal lumen in fluid communication with an exit of the extruder to receive flow of the mineral entrained polymer composition in molten form, the lumen terminating at an applicator to which the entrained polymer composition in molten form is conveyed; the applicator comprising a dispenser for applying the entrained polymer in the predetermined shape to the surface of the substrate.

5. The method of claim 4, wherein the entrained polymer composition in molten form is conveyed through the lumen prior to step (b) and the lumen is heated to maintain a molten state of the entrained polymer composition when conveyed through the lumen, the dispenser being heated to maintain the molten state of the entrained polymer composition in step (b) and to facilitate precise formation of the entrained polymer into the predetermined shape in step (b).

6. The method of claim 4, the dispenser comprising a valve that alternates between a closed state and an open state so as to precisely form the entrained polymer structure in the predetermined shape.

7. The method of claim 4, wherein prior to step (b), solid entrained polymer pellets are provided into the extruder and melted to form the entrained polymer composition in molten form.

8. The method of claim 7, wherein the solidified entrained polymer structure is in the form of a strip of film having a thickness of from 0.1 mm to 1.5 mm.

9. The method of claim 8, wherein the substrate is a foil, the surface of the substrate comprises a polymer sealing layer on the foil, and the substrate is a portion of a package for a moisture-sensitive product, wherein the package is a flexible package, a pouch or a blister pack.

10. The method of claim 1, wherein the method is carried out as part of an automated, in-line package production process.

11. The method of claim 1, wherein the solidified entrained polymer structure adheres to the substrate without use of a separate adhesive material.

12. The method of claim 1, wherein the 3 A molecular sieve is from 30% to 80%, by weight of the entrained polymer composition.

13. The method of claim 4, the solidified entrained polymer structure comprising an outer perimeter, wherein the surface of the substrate extends outwardly beyond at least a portion of the outer perimeter.

14. The method of claim 1, wherein:
  a. the substrate is a foil and the surface of the substrate comprises a polymer sealing layer on the foil;
  b. the solidified entrained polymer structure is in the form of a film having a thickness of from 0.1 mm to 1.2 mm;
  c. the method is carried out as part of an automated, in-line package production process, the substrate being a portion of a package for a moisture-sensitive product;
  d. the solidified entrained polymer structure adheres to the substrate without use of a separate adhesive material;
  e. the 3 A molecular sieve is from 30% to 80% by weight of the entrained polymer composition; and
  f. the solidified entrained polymer structure comprises an outer perimeter, wherein the surface of the substrate extends outwardly beyond at least a portion of the outer perimeter.

15. The method of claim 14, wherein the method is carried out using a hot melt dispensing apparatus comprising: an extruder for providing a flow of mineral entrained polymer composition in molten form; one or more hoses, each hose having an internal lumen in fluid communication with an exit of the extruder to receive flow of the mineral entrained polymer composition in molten form, the lumen terminating at an applicator to which the entrained polymer composition in molten form is conveyed, the applicator comprising a dispenser for applying the entrained polymer in the predetermined shape to the surface of the substrate, the dispenser comprising a valve that alternates between a closed state and an open state so as to precisely form the entrained polymer structure in the predetermined shape.

16. The method of claim 15, wherein the entrained polymer composition in molten form is conveyed through the lumen prior to step (b) and the lumen is heated to maintain a molten state of the entrained polymer composition when conveyed through the lumen, and further wherein the dispenser is heated to maintain a molten state of the entrained polymer composition in step (b) and to facilitate precise formation of the entrained polymer into the predetermined shape in step (b).

* * * * *